C. J. JAGER.
INTERNAL COMBUSTION ENGINE.
APPLICATION FILED OCT. 17, 1904.

1,105,142.

Patented July 28, 1914.
5 SHEETS—SHEET 3.

Witnesses:
J. Henry Parker
Oscar F. Hill

Inventor:
Charles J. Jager
by Macleod Calvert Randall
Attorneys.

C. J. JAGER.
INTERNAL COMBUSTION ENGINE.
APPLICATION FILED OCT. 17, 1904.

1,105,142.

Patented July 28, 1914.
5 SHEETS—SHEET 4.

Witnesses:
J. Henry Parker
Oscar F. Hill

Inventor:
Charles J. Jager
by Macleod Calver & Randall
Attorneys.

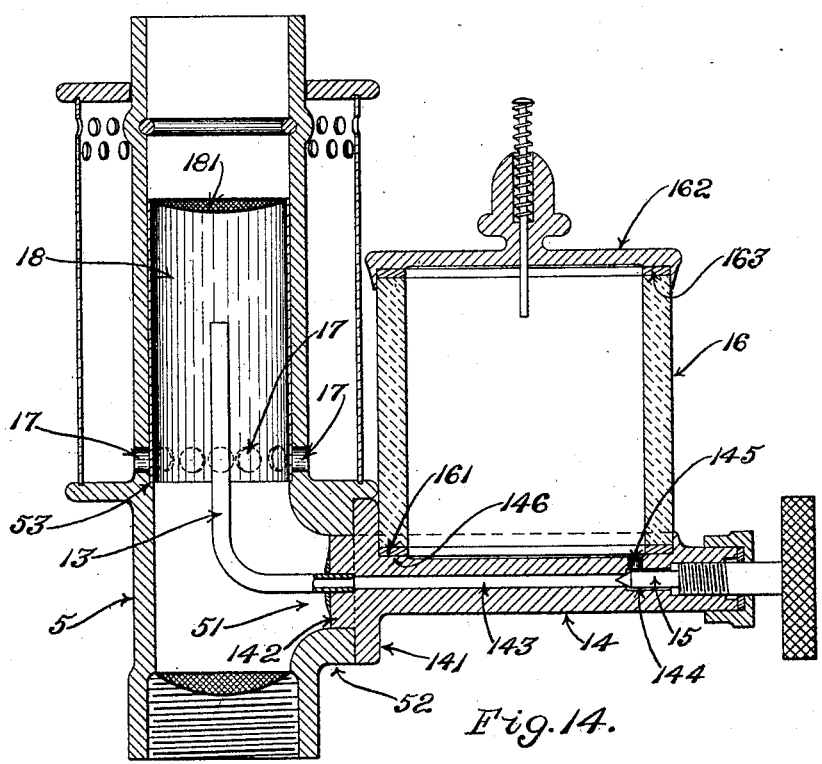
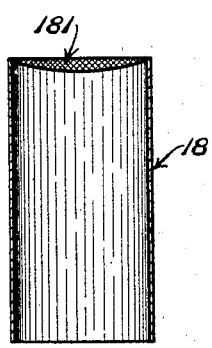
Fig. 14.
Fig. 15.

UNITED STATES PATENT OFFICE.

CHARLES J. JAGER, OF BOSTON, MASSACHUSETTS, ASSIGNOR, BY MESNE ASSIGNMENTS, TO JAGER ENGINE COMPANY, OF TAUNTON, MASSACHUSETTS, A CORPORATION OF MASSACHUSETTS.

INTERNAL-COMBUSTION ENGINE.

1,105,142.   Specification of Letters Patent.   Patented July 28, 1914.

Application filed October 17, 1904. Serial No. 228,707.

*To all whom it may concern:*

Be it known that I, CHARLES J. JAGER, a citizen of the United States, residing at Boston, in the county of Suffolk, State of Massachusetts, have invented a certain new and useful Improvement in Internal-Combustion Engines, of which the following is a specification, reference being had therein to the accompanying drawings.

The invention relates to internal combustion engines of the class having electric sparkers or igniters for firing the charges of gaseous fuel within the combustion chambers thereof, and in which the gaseous fuel that is employed consists of air enriched or carbureted by the admixture therewith of the vapor of a hydro-carbon.

The aims in general of the invention are to simplify and facilitate the work of controlling the running of an engine such as aforesaid, by enabling the fuel supply, the air supply, and the action of the electric sparker or igniter, to be controlled by means of a single handle or lever, for the purpose of starting and stopping the engine, and of controlling the speed thereof. Also, to provide an improved construction of means of varying the timing of the sparker or igniter. The said aims are secured in the manner which will now be explained with the aid of the accompanying drawings, in which latter I have illustrated certain of the essential parts of an engine, with the invention embodied in the best form in which it has thus far been reduced to practice.

Figure 1:
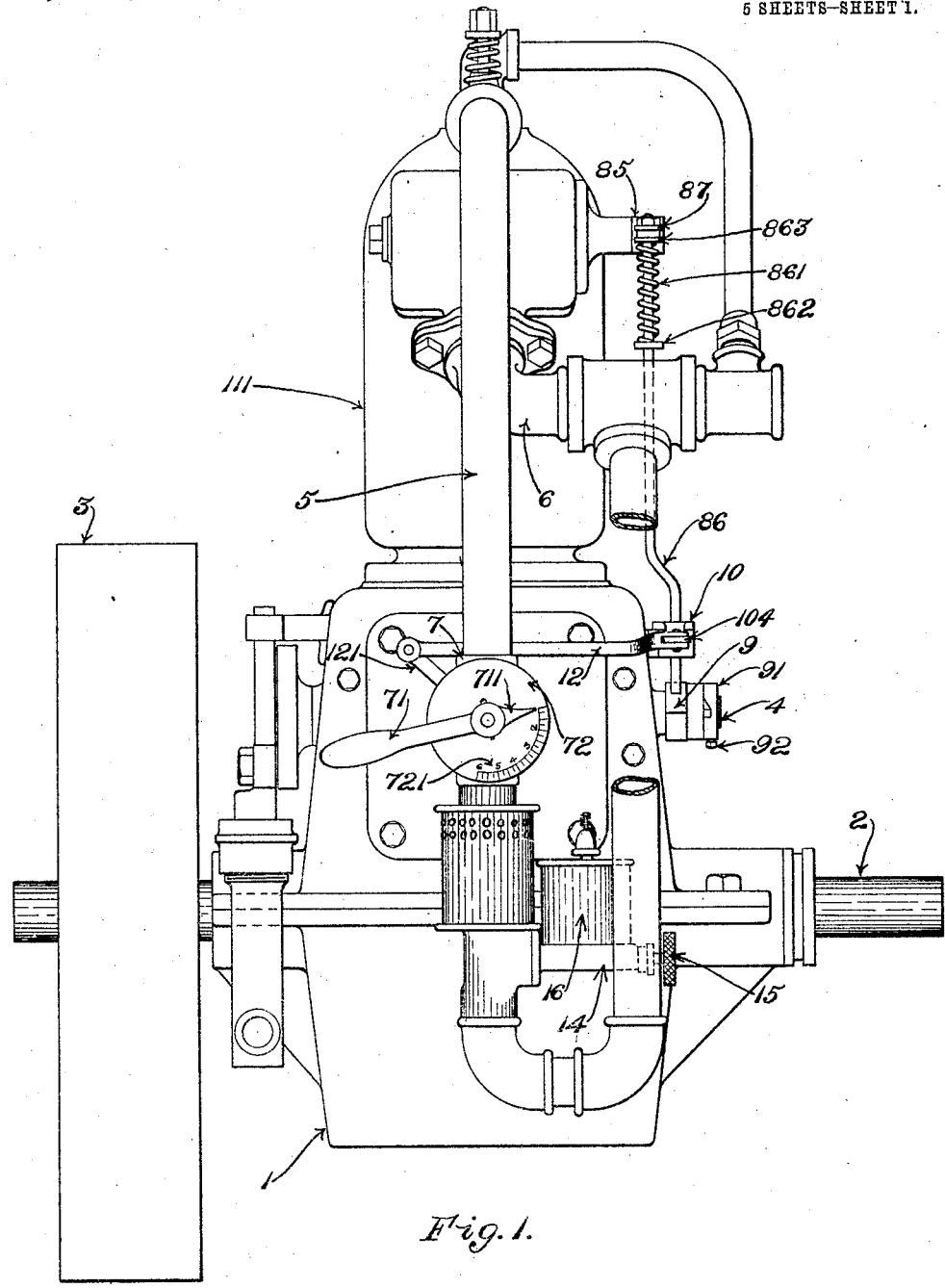
Figure 2:
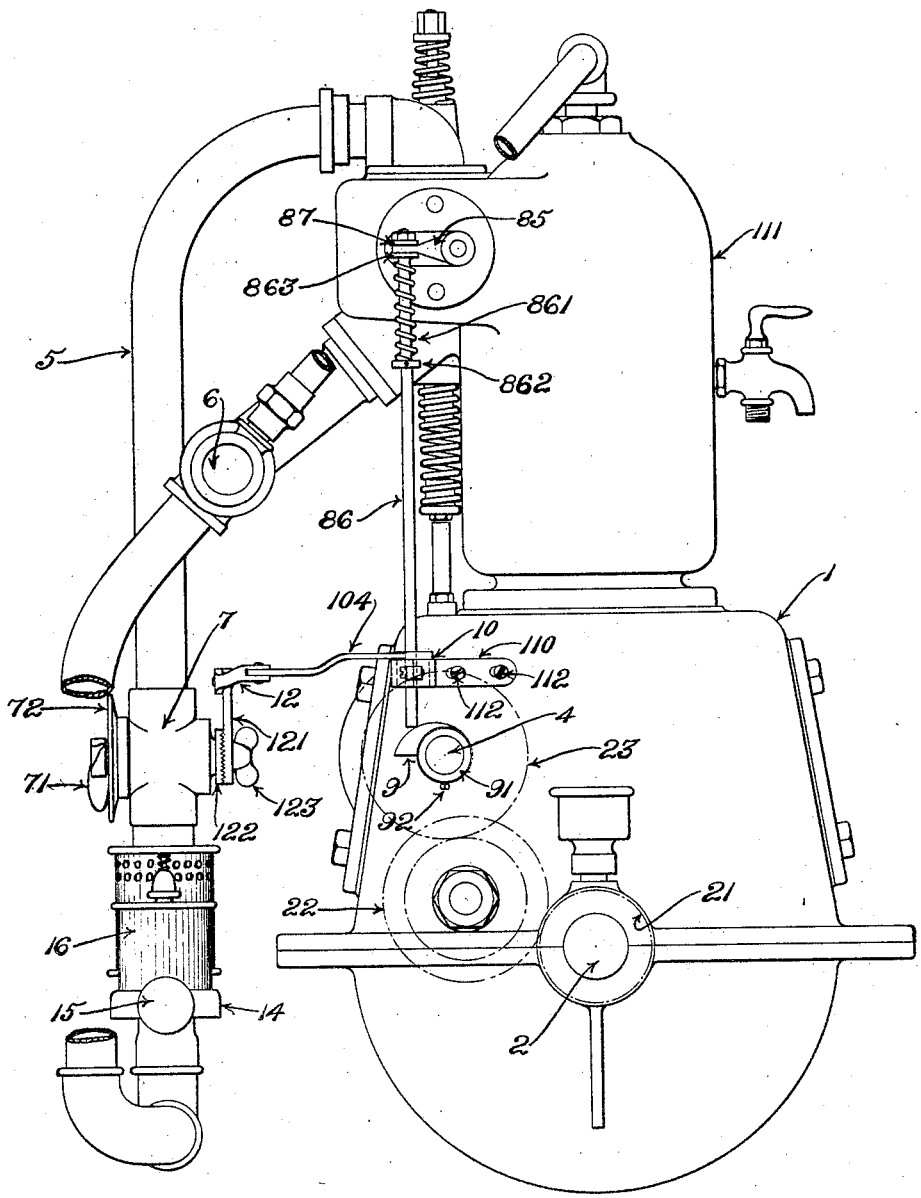
Figures 3, 4:
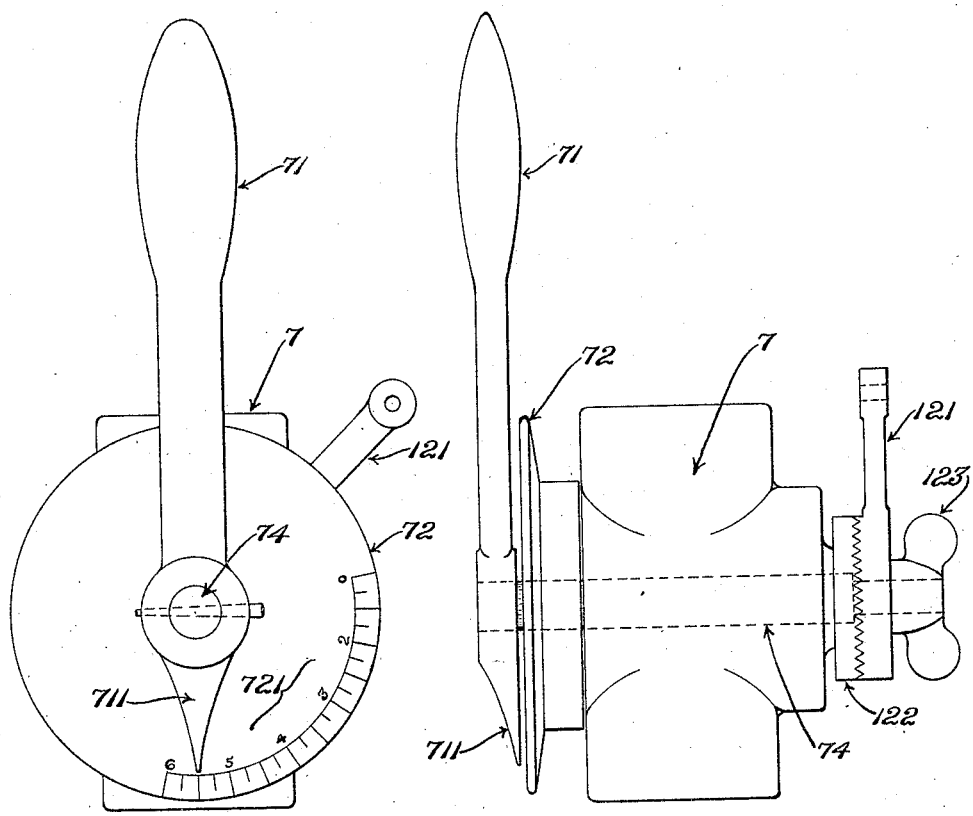
Figure 12:
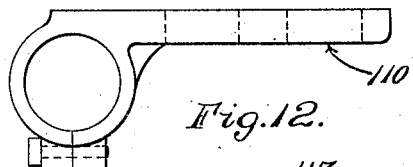
Figure 13:
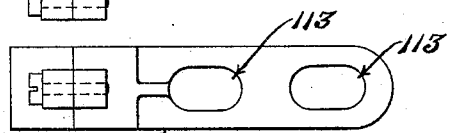
Figure 10:
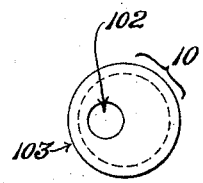
Figure 5:
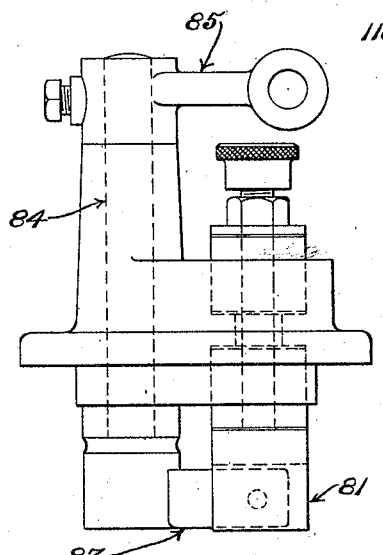
Figure 11:
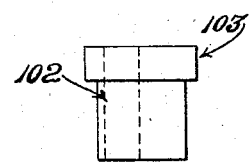
Figure 7:
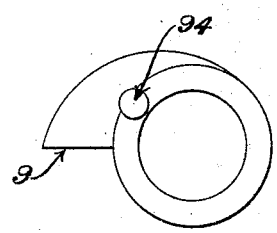
Figure 6:
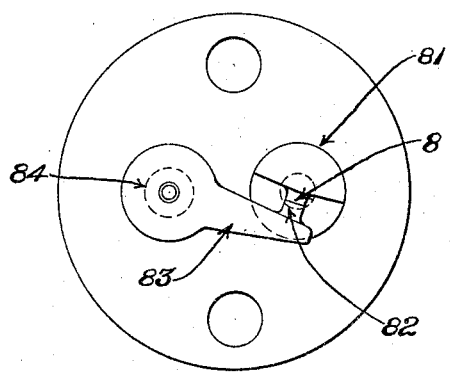
Figures 8, 9:
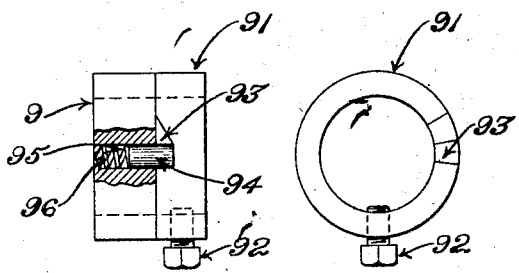

In the drawings,—Figure 1 shows in elevation the said essential parts of an engine, together with the said embodiment of the invention. Fig. 2 is a view of a portion of the engine in side elevation, looking from the right hand in Fig. 1. Fig. 3 shows the throttle detached in front elevation. Fig. 4 shows the same in side elevation. Fig. 5 shows the electric sparker or igniter in plan, detached. Fig. 6 is an elevation of the inner end of the electric sparker or igniter. Fig. 7 shows the sparker-cam in side elevation. Fig. 8 shows in front elevation, with a certain portion broken away to disclose interior construction, the sparker-cam and the clutch-collar which is employed alongside the same. Fig. 9 is a side elevation of the clutch-collar. Fig. 10 is a plan view of the igniter or spark-eccentric. Fig. 11 is a side elevation of the igniter or sparker-eccentric. Fig. 12 is a plan view of the supporting bracket for the igniter-eccentric. Fig. 13 is a side elevation of the supporting bracket for the igniter eccentric. Fig. 14 shows the vaporizing carbureter in vertical section. Fig. 15 shows the automatic valve of the vaporizing carbureter, detached, in vertical section.

Having reference to the drawings,—the main frame, or shell and casing, of the engine, in general, is designated 1. The crankshaft is indicated at 2, and the fly-wheel is marked 3, Fig. 1. A secondary shaft is indicated at 4, it being driven from the crankshaft 2 at a relatively lower rate of speed by means of speed-reducing gearing which may be, for instance, such as that which is indicated in dotted lines at 21, 22, 23 in Fig. 2.

The fuel-supply pipe is shown at 5, and the exhaust pipe is shown at 6. A throttle-valve or throttle which is employed in connection with the fuel-supply pipe is located at 7, the operating handle or lever thereof being designated 71. In practice the throttle-valve or throttle may be operated by hand, as frequently is the case and as provided for in the present instance. If desired, provision may be made for operating the same automatically through connections with a governor, in manner which will be apparent to those who are skilled in the art. The fixed disk 72 is mounted in connection with the casing of the throttle or throttle-valve, and provided with the graduations 721, while the handle or lever 71 is furnished with an index or pointer 711 working in connection with the said graduations and showing by its position with relation thereto the closed or open condition of the throttle or throttle-valve, as well as the extent to which the same has been opened. By means of the said throttle or throttle-valve the fuel-supply is regulated in well-known manner.

The firing or combustion-chamber is located within the portion of the shell or casing which is marked 111. The fuel-supply pipe 5 and exhaust-pipe 6 communicate with the said firing or combustion-chamber, the communication being controlled in well-known manner by means of valves, which latter and their actuating connections it is unnecessary to show or describe herein, inasmuch as they are or may be as usual and in themselves constitute no portion of the invention. The contact-points of the electric sparker or igniter are contained within the said firing or combustion-chamber. The electric sparker or igniter in itself is not a feature of the invention, and the construction and arrangement thereof may vary more or less in practice, as deemed advisable.

In order to assist in the disclosure of the manner in which the present invention may be carried into effect I have shown sparking or igniting devices which in the main are essentially as heretofore, and I will now explain the same as follows: The said contact-points are shown in detail in Figs. 5 and 6. The fixed contact-point is designated 8 in Fig. 6, it being mounted upon a stationary support, as 81. The movable contact-point is designated 82. It is carried by an arm 83, which latter is fast upon the inner end of a short rock-shaft 84. The other end of the said rock-shaft projects outside the portion 111 of the casing, and has fast thereon an arm 85 for connection with the devices for actuating the rock-shaft. The arm 85 is flattened at its free extremity and formed with a vertical hole extending therethrough, and through this hole is extended the upper end of a rod 86. The said rod is provided above the arm 85 with a collar or head 87. Thereby the rod is hung upon the said arm. The weight of the arms 83, 85, and rod 86 acts with a tendency to separate the movable contact-point 82 from the fixed contact-point 8, and when permitted so to do, effects and maintains such separation. For the purpose of causing the movable contact-point to touch the fixed contact-point it is necessary to move the rod 86 endwise in an upward direction. In order to produce this endwise movement of the said rod, a cam 9 is provided upon the secondary shaft 4, and is arranged to engage in its rotation by the periphery thereof with the lower end of the rod. In this movement of the rod, the movable contact-point is operated therefrom through the medium of the expanding spiral spring 861, which encircles the rod between the fixed collar 862 upon the rod and a washer 863 which intervenes between the upper end of the spring and the under side of the arm. A yielding medium such as the spring 861 is used as a means of transmitting movement from rod 86 to the movable contact-point, because the various adjustments of the lower end of the rod tangentially with relation to the path of the cam 9, to which I will next refer, result in varying the distance through which the rod is moved by the action of such cam. The spring is employed, moreover, in order that, after having been compressed by upward movement of the rod 86 in excess of that necessary to press the movable contact-point against the fixed contact-point, it may act expansively to set the rod in motion downwardly as soon as the rod is released by the cam in its rotation, producing thereby movement of the rod relative to the arm 85, and causing the head 87, upon the upper end of the rod to engage sharply with the said arm 85 in the course of such movement, occasioning thus a quick separation of the movable contact-point from the fixed contact-point and separating the former widely from the latter, whereby a spark is produced under the best conditions.

In order to guard against injury to the parts, or breakage thereof, as a result of engagement of the radial portion of the cam 9 with the lower end of the rod 86 when the crank-shaft and secondary shaft are rotated backwardly, the said cam 9 is loose upon the secondary shaft 4 and is coupled therewith by means of a clutch, which latter acts to cause the cam to turn in unison with the secondary shaft when the latter rotates forwardly, but permits the cam to slip relative to the shaft and remain stationary when the said radial portion of the cam engages with the rod in the backward turning of the secondary shaft. One member of the clutch consists of a collar 91, that is mounted upon the outer end of the secondary shaft 4 and fixedly connected therewith by means of a clamping screw 92. This collar 91 is set upon the shaft 4 closely adjacent the cam 9, and the side of the same which is toward the cam is formed with a notch 93 having one end thereof square and the other inclined. The other element of the clutch consists of a pin 94 occupying a chamber 95 which is formed in the cam 9, the said chamber extending parallel with the axis of the secondary shaft. An expanding spiral spring 96 contained within the said chamber is compressed between the inner end of the pin and the inner end of the chamber. The said spring acts with a tendency to project the outer end of the pin from the said chamber, and during the normal running of the engine the said outer end of the pin is caused by the action of the said spring to occupy the notch 93 which is formed, as above referred to, in the fixed collar 91. In the forward rotation of the secondary shaft the square end of the notch 93 engages with the portion of the pin 94 which is received within the notch, and operates to cause the cam to turn in unison with the secondary shaft. When, however, the secondary shaft is caused to be turned in the reverse direction, the oblique end of the notch 93 presses the pin endwise into the chamber of the cam so that the secondary shaft turns without communicating movement to the cam.

The improved means of adjusting the lower end of the rod 86 tangentially with relation to the path of rotation of the cam 9 for the purpose of varying the point in the rotation of the said cam at which the highest portion of the cam releases the lower end of the rod so as to permit the rod to drop, thereby varying in like measure the time of sparking, embraces as its characteristic element the so-called igniter-eccentric 10. The said igniter-eccentric 10 consists, essentially, of a short cylinder that is mounted in a bearing that is provided therefor in a bracket 110, Figs. 2, 12 and 13, the said bracket being termed the igniter-bracket. The upper portion of the igniter-eccentric is formed with a flange 103 that rests upon the upper end of the said bearing, whereby the igniter-eccentric is supported vertically. The igniter-eccentric has a hole 102 formed therethrough. This hole is located in an eccentric position with respect to the axis of the igniter-eccentric and from this fact the latter part derives its name. The lower portion of the rod 86 passes through the hole 102 of the igniter-eccentric, the lower end of the rod projecting below the igniter-eccentric. Because of the eccentric position of the hole 102, it follows that when the igniter-eccentric is turned around its vertical axis within the bearing that is provided therefor in the igniter-bracket the position of the lower end of the rod 86 is shifted relative to the cam. This enables such position to be varied tangentially with respect to the cam as aforesaid. The igniter-bracket is attached to the shell or casing 1 by means of screws 112, 112, Fig. 2 passing through horizontal slots 113, 113, that are made in the said bracket. The said slots enable the bracket to be adjusted in a direction to set the lower end of the rod 86 nearer to or farther from the axis of the secondary shaft 4. In order to enable the igniter-eccentric 10 to be turned for the purpose of effecting the adjustment of the rod 86 with reference to the cam 9 by which the timing of the sparking is regulated, a pin or arm 104 is secured to the flange 103 thereof and projects horizontally therefrom.

The igniter-eccentric 10 is connected with the throttle or throttle-valve 7, so that when the latter is adjusted the said igniter-eccentric will be adjusted in unison therewith. The mode of connecting the parts may vary in practice. Herein a rod 12 links the pin or arm 104 to an arm 121 which is connected with the valve-stem 74 of the throttle or throttle-valve. Rotation of the valve causes movement to be transmitted by means of the valve-stem 74, arm 121, rod 12, and pin or arm 104, to the igniter-eccentric. Thereby the fuel-supply and time of sparking are adjusted simultaneously. It is desired to make provision for relative adjustment of the throttle or throttle-valve and igniter-eccentric with respect to each other, in order that the required timing of the sparking may be secured with as great a degree of nicety as may be desired. To this end, the arm 121 is mounted upon the valve-stem 74 with capacity for angular adjustment thereon. See Figs. 3 and 4. Herein, the arm is provided upon one face of its hub with serrations, and a collar 122 that is fast upon the valve-stem is formed upon its proximate face with a corresponding series of serrations. The proximate end of the valve-stem is screw-threaded and has fitted thereon a thumb-nut 123, by means of which latter the hub of the arm 121 may be compressed against the collar 122 so that the two series of serrations shall interengage. By this means the arm 122 is held locked upon the valve stem in any position of angular adjustment thereon which may be given to it.

I have already explained the manner in which the throttle and electric sparker or igniter are combined operatively with a single handle or lever so that thereby the fuel-supply and the sparking are both controlled by a single handle or lever. It remains to explain how the air-supply is rendered responsive to the control of the said handle or lever. This last is secured through the employment of a vaporizing carbureter having an automatic valve on the general order of that which is shown in Figs. 14 and 15. In order that the working of the said valve may be understood I will explain the construction and operation of the carbureter and valve with reference to the said figures. The valve-arrangement which is shown in Fig. 14 maintains uniformity in the relative proportions of air and vapor in the gaseous mixture constituting the fuel that is supplied to the engine, and it accomplishes this throughout variations in the speed of the engine and the accompanying variations in the rate of flow of air through the carbureter, by permitting a relatively increased volume of air to enter the fuel-supply pipe when the speed of the engine increases and by reducing the volume of air to the normal when the speed of the engine lowers.

Having reference now to Fig. 14, a hydrocarbon pipe 13 rises centrally within the fuel-supply pipe 5 the former pipe in practice being supplied with the hydrocarbon from which is produced the vapor that unites with the air flowing through the fuel-supply pipe 5 to form the gaseous mixture constituting the fuel which is consumed in the engine. The fuel-supply pipe 5 is formed with an opening 51 at one side thereof, and with a projecting rim 52 around the said opening. To the outer portion of the said rim 52 is applied a flange 141 that is formed at one end of a stand 14, the said stand having also a circular enlargement or boss 142 which fits within the opening 51. The stand has a longitudinal bore or passageway 143 formed therethrough, such bore or passageway 143 opening at the inner end of the boss or enlargement 142. The lower end of the hydrocarbon pipe 13 is bent so as to extend at right angles with respect to the main portion of such pipe, and extends into the opening 51, its extremity being inserted into the inner end of the bore or passageway 143 of the stand 14, and being secured fixedly therein. The outer end of the bore or passageway 143 in the stand 14 is enlarged to form a valve-chamber 144, and within the said valve-chamber works a needle-valve 15. The said needle-valve serves to control the flow of hydrocarbon through the bore or passageway 143 to the hydrocarbon pipe 13. An entrance-port 145 communicates with the valve-chamber at the outer side of the valve-seat, the said entrance-port extending downward through the top of the stand to the valve-chamber. The stand supports a glass cylinder 16, the latter constituting the body of a cup which, in practice, contains a quantity of the hydrocarbon with which the hydrocarbon pipe 13 is supplied. The stand is formed at its upper side with a seat 146 for the lower end of the glass cylinder 16, a ring of cork, 161, being applied to the said seat to constitute a cushion and packing for the lower end of the glass cylinder. A cap 162 is applied to the upper end of the glass cylinder, a similar ring of cork 163 being interposed between the said upper end and the said cap. The space within the cylinder contains in practice a float having in connection therewith a valve by means of which communication between the interior of the cylinder and a storage receptacle is controlled, the action being to maintain automatically a constant level of the hydrocarbon within the cylinder, in order that the hydrocarbon may always rise within the vertical portion of the hydrocarbon pipe 13 to within a predetermined short distance of the upper end of the said pipe. The float, etc., are well known and in general use in connection with devices of this class, and it is unnecessary to show them herein. In operation, the hydrocarbon flows from the float-chamber, through the port 145 at the bottom thereof into the valve-chamber 144, and past the valve 15 through the bore or passageway 143 into the hydrocarbon pipe 13. The air which travels through the fuel-supply pipe 5 under atmospheric pressure on its way to the engine takes the hydrocarbon by aspiration from the upper end of the pipe 13 in the form of vapor. The needle-valve 15 is provided in connection with the bore or passageway 143 of the stand 14, in order that by adjustment thereof the rate of flow of the hydrocarbon from the float-chamber through the bore or passageway of the stand into the hydrocarbon pipe may be regulated at will.

For the purpose of permitting additional volumes of air to enter the fuel-supply pipe 5 when required, a series of inlet ports 17, 17, 17, etc., is formed through the shell of the said pipe around the vertical portion of the hydrocarbon pipe 13. In connection with the said inlet ports the valve 18 is employed for the purpose of regulating automatically the inflow of air through the said ports. The said valve 18 consists, essentially, of a cylinder having a sliding fit within the interior of the fuel-supply pipe, and also having its upper end furnished with a diaphragm 181, which latter, preferably, is of finely-meshed wire gauze. The valve 18 occupies normally a lowered position in which its lower end rests upon a ledge 53 that is formed upon the interior of the pipe 5. In this position the shell of the valve 18 closes the air-inlet ports 17, 17, 17, etc. The valve 18 occupies this position during the running of the engine at ordinary speed. When, however, the speed of the engine is caused to increase through the opening of the throttle and the acceleration in the timing of the sparking, the fuel passes through the fuel-supply pipe on the way to the engine with a correspondingly increased rate of flow. With this increased rate of flow the air within the fuel-supply pipe flowing past the hydrocarbon pipe tends to take up a greater proportion of hydrocarbon vapor, and thereby to render the fuel too rich for satisfactory results in its combustion within the engine if not compensated for. The increased velocity of the flow through the fuel-supply pipe operates, however, to lift the valve to a degree corresponding with the increase in the rate of flow through the fuel-supply pipe, thereby uncovering the air-inlet ports 17, 17, 17, etc. The uncovering of the said air-inlet ports permits additional quantities of air to enter therethrough. In this manner, the relative proportions of air and vapor in the fuel are kept the same, whatever may be the rate of speed of the engine.

It will be perceived that I have combined in an internal combustion engine a throttle for the fuel-supply, an electric sparker or igniter, an operating handle or lever by means of which the throttle and igniter or sparker are regulated or controlled in unison, and a valve controlling the air-supply and which is responsive to variations in the rate of flow through the fuel-supply pipe which result from the manipulation of the throttle and sparker or igniter. From this it follows that the fuel-supply, the air-supply, and the action of the electric sparker or igniter are all controlled by means of a single handle or lever for the purpose of starting and stopping the engine, and of controlling the speed thereof.

The vaporizing carbureter and its valve arrangement are not claimed specifically herein. They constitute the subject of separate claims in my application for United States Letters Patent filed April 29, 1904, Serial No. 180,166.

I claim as my invention:—

In an internal combustion engine, in combination, the throttle for the fuel supply, the electric sparker or igniter having the operating cam and the transmitting member which is engaged and actuated by the said cam, the igniter eccentric by which the position of the said member is adjusted tangentially with relation to the path of the cam, and a connection from the said throttle to the said igniter eccentric whereby the fuel supply and timing of the sparking are controlled in unison.

In testimony whereof I affix my signature in presence of two witnesses.

CHARLES J. JAGER.

Witnesses:
  CHAS. F. RANDALL,
  EDITH J. ANDERSON.